United States Patent
Chou et al.

(10) Patent No.: US 11,693,814 B2
(45) Date of Patent: Jul. 4, 2023

(54) SYSTEMS AND METHODS FOR EXPANDING MEMORY ACCESS

(71) Applicant: QUANTA COMPUTER INC., Taoyuan (TW)

(72) Inventors: Le-Sheng Chou, Taoyuan (TW); Sz-Chin Shih, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/127,279

(22) Filed: Dec. 18, 2020

(65) Prior Publication Data

US 2022/0197848 A1 Jun. 23, 2022

(51) Int. Cl.
*G06F 13/42* (2006.01)
*G06F 13/40* (2006.01)

(52) U.S. Cl.
CPC ........ *G06F 13/4282* (2013.01); *G06F 13/409* (2013.01); *G06F 13/4022* (2013.01); *G06F 13/4068* (2013.01); *G06F 13/4221* (2013.01)

(58) Field of Classification Search
CPC ............. G06F 13/4282; G06F 13/4022; G06F 13/4068; G06F 13/409; G06F 13/4221
See application file for complete search history.

(56) References Cited

U.S. PATENT DOCUMENTS

| | | | |
|---|---|---|---|
| 10,402,363 B2 | 9/2019 | Long et al. | |
| 2014/0032888 A1* | 1/2014 | O'Mullan | G06F 9/24 713/1 |
| 2014/0108683 A1* | 4/2014 | Thayer | G06F 3/0671 710/74 |
| 2014/0268577 A1* | 9/2014 | Swaminathan | H05K 1/0204 174/251 |
| 2015/0003791 A1* | 1/2015 | Butler | G02B 6/4249 385/88 |
| 2015/0121133 A1* | 4/2015 | Wang | G06F 11/1076 714/6.24 |
| 2015/0134868 A1* | 5/2015 | Shaeffer | G06F 13/126 710/300 |

(Continued)

FOREIGN PATENT DOCUMENTS

TW     I586239 B      6/2017
TW     201743217 A    12/2017

(Continued)

OTHER PUBLICATIONS

TW Office Action for Application No. 110114843, dated Dec. 17, 2021, w/ First Office Action Summary.

(Continued)

*Primary Examiner* — Henry Tsai
*Assistant Examiner* — Harry Z Wang
(74) *Attorney, Agent, or Firm* — Nixon Peabody LLP

(57) ABSTRACT

A system and device for expanding accessible memory of a processor is provided. An interposer is coupled to the processor and a memory module. The interposer is coupled to a first connection and a second connection. The interposer includes a memory controller circuit. The memory controller circuit receives signals from the processor, using the first connection, and transmits the received signals to the memory module, using the second connection. The interposer expands memory access without an unnecessary second processor.

11 Claims, 5 Drawing Sheets

(56) References Cited

U.S. PATENT DOCUMENTS

| | | | | |
|---|---|---|---|---|
| 2016/0301752 A1* | 10/2016 | Botes | ................... | G06F 3/0661 |
| 2017/0068633 A1* | 3/2017 | Kwon | ................... | H01L 25/105 |
| 2017/0354031 A1* | 12/2017 | Aoki | ..................... | H05K 3/341 |
| 2018/0006391 A1* | 1/2018 | Alcorn | .................. | H05K 3/368 |
| 2020/0096553 A1* | 3/2020 | Park | ..................... | G01R 1/0408 |
| 2020/0132953 A1* | 4/2020 | Rosenberg | ............ | G02B 6/422 |
| 2020/0227362 A1* | 7/2020 | Thibado | ............ | H01L 23/49827 |

FOREIGN PATENT DOCUMENTS

| | | |
|---|---|---|
| TW | 1639919 B | 11/2018 |
| TW | 201908974 A | 3/2019 |

OTHER PUBLICATIONS

TW Search Report for Application No. 110114843, dated Dec. 17, 2021, w/ First Office Action.

* cited by examiner

SYSTEMS AND METHODS FOR EXPANDING MEMORY ACCESS

TECHNICAL FIELD

The present disclosure relates generally to signaling within computing systems, and more particularly, to systems and methods for using a memory interposer to extend accessible memory of a processor.

BACKGROUND

Servers are employed in a large number of applications ranging from high-performance computing to database storage. Servers are the backbone of many computing application solutions that have come to be relied upon. For example, servers may support mobile application solutions such as mobile mapping applications, mobile payment systems, text messaging, computation offloading, web browsing, etc. Servers increasingly use customized processors and/or multiple processors in order to meet computing demands. Customized processors are accessible or available to only a few customers as customized processors are expensive. The additional expense associated with customized processors can be attributed to design costs of the customized processor, an expectation of the market size for the customized processor, and complexity involved in manufacturing the customized processor.

Costs associated with processors in servers can be alleviated by using widely available general purpose processors instead of customized processors. General purpose processors are typically marketed to the general public, and hence have a wider range of applications than customized processors. General purpose processors are also easily programmable because of widely available standards and tools provided by the companies providing these processors. Unfortunately, general purpose processors used for high performance computing are more expensive than general purpose processors used in everyday consumer products for the general public. This is because the high performance computing market requires processors optimized for processing speed and handling parallel transactions while an everyday consumer product may only require moderate processor performance for web browsing applications. The high performance computing market for processors is thus smaller when compared to the processor market for everyday consumer products for the general public. The general public does not need a high performance processor cluster system, so processors used in high performance clusters are used by a smaller subset of the processor-buying market. Thus, general purpose processors for high performance computing can be expensive because of a comparatively smaller market demand.

Servers for high performance computing can use one or more central processing units (CPUs) and/or graphics processing units (GPUs). The CPUs and/or GPUs can have multiple physical and logical cores. Motherboards of these servers typically have sockets for multiple processors. Motherboard design can reserve on-board memory access to specific processors. Some server applications can be memory limited while others can be processor limited. A motherboard design that requires a specific number of processors in order to access a specific amount of memory can become prohibitively expensive. On-board memory for high performance computing is more expensive than memory marketed to the general public. Buying an unnecessary processor in addition to the needed memory can greatly increase server costs. One potential solution is to add additional memory to boost existing processor performance. Thus, the present disclosure is directed at solving problems related to expanding memory access for a processor in a high performance computing server without requiring a motherboard redesign.

SUMMARY

Some implementations of the present disclosure provide a system including a processor coupled to a first connection, a memory module coupled to a second connection, and an interposer coupled to the first connection and the second connection. The interposer includes a memory controller circuit. The memory controller circuit receives signals from the processor, using the first connection, and transmits the received signals to the memory module, using the second connection.

In an embodiment, the first connection is a high speed connection that supports a compute express link (CXL) interface or a Peripheral Component Interconnect Express (PCIe) interface. In an embodiment, the second connection supports a double data rate (DDR) standard including DDR3, DDR4, or DDR5. In an embodiment, the memory controller of the interposer interprets signals between the memory module and the processor to allow the processor access to the memory module. In an embodiment, the interposer includes an optional interconnect module for the first connection. In an embodiment, the interposer includes a copper based connector.

In an embodiment, the system further includes a motherboard with two processor sockets. The processor is connected to a first one of the two processor sockets and the interposer is connected to a second one of the two processor sockets. In an embodiment, the system further includes a first motherboard and a second motherboard. The first motherboard includes two processor sockets. The processor is connected to a first one of the two processor sockets, and the interposer is connected to a second one of the two processor sockets. The second motherboard includes one or more processors, and the interposer is electrically connected to the one or more processors on the second motherboard. In an embodiment, the one or more processors on the second motherboard has access to memory modules on the first motherboard via the interposer on the first motherboard. In an embodiment, the processor is one of a central processing unit (CPU) or a graphics processing unit (GPU).

Some implementations of the present disclosure provide an interposer for expanding accessible memory of a processor by providing the processor access to a memory module. The interposer includes a circuit board, a high speed communication interface provided on the circuit board, a double data rate (DDR) communication interface provided on the circuit board, and a memory controller circuit. The memory controller circuit transmits signals, received from the processor via the high speed communication interface, to the memory module using the DDR communication interface.

In an embodiment, the interposer further includes a package with pins. The circuit board is bonded to the package. In an embodiment, the high speed communication interface is one of a CXL interface or a PCIe interface. In an embodiment, the high speed communication interface includes an optional interconnect module for cable routing. In an embodiment, the high speed communication interface includes a copper-based high speed connector. In an embodiment, the processor is one of a CPU or a GPU.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings.

Figure 1:
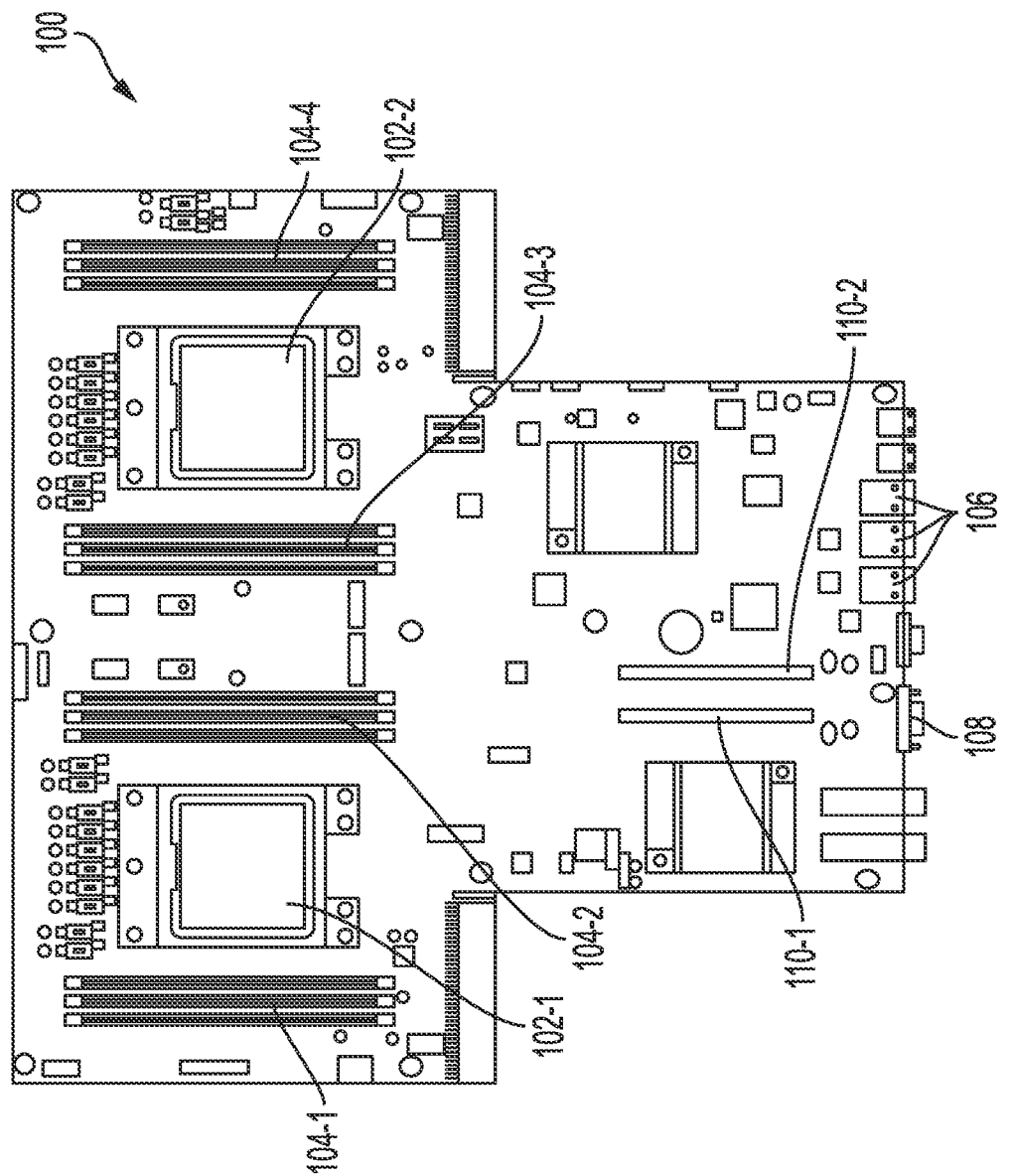
FIG. 1 illustrates a prior art processor arrangement on an example motherboard.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Embodiments of the present disclosure provide a memory interposer for expanding accessible memory of a processor of a computing system. The processor can be one or more CPUs, GPUs, or any combination thereof. The memory interposer is a packaged circuit with pin structure that fits in a socket for a processor. The computing system preferably has multiple processor sockets, where at least one of the processor sockets receives a processor and another one of the processor sockets receives the memory interposer. The memory interposer allows inaccessible on-board memory to be accessible by the processor. The memory interposer includes a memory controller that generates appropriate signals to enable the processor to access the inaccessible on-board memory. The memory interposer performs a simpler task than a general purpose processor and can thus be cheaper to obtain when compared to the general purpose processor. Thus, costs associated with building the computing system can be reduced.

FIG. 1 illustrates a prior art processor arrangement on an example motherboard 100. The motherboard 100 includes two processors 102-1 and 102-2. The motherboard 100 includes four sets of on-board memory module slots 104-1, 104-2, 104-3, and 104-4. The motherboard includes one or more ports 106, 108. In an example, the port 108 can be a serial port, and the ports 106 can be universal serial bus (USB) ports. The motherboard 100 includes PCIe expansion slots 110-1 and 110-2.

The motherboard 100 is modular in that the processor 102-1 is able to access memory modules inserted in the set of on-board memory module slots 104-1 and 104-2 but cannot access memory modules inserted in the set of on-board memory module slots 104-3 and 104-4. The memory modules for the set of on-board memory slots 104-1, 104-2, 104-3, and 104-4 can be dual in-line memory modules (DIMMs) that support Double Data Rate (DDR) memory technology standards. For example, the memory modules can support DDR3, DDR4, DDR5, etc. The set of on-board memory module slots 104-1 and 104-2 can receive memory modules (e.g., DIMMs), and the processor 102-1 can access the memory modules for short-term storage. The modular nature of the motherboard 100 also means that the PCIe expansion slot 110-1 is matched to the processor 102-1, and the PCIe expansion slot 110-2 is matched to the processor 102-2.

Due to the modular nature of the motherboard 100, the processor 102-1 is unable to directly access memories in the set of on-board memory module slots 104-3 and 104-4. The processor 102-2 must be installed in the motherboard 100 in order to use memory modules installed in the set of on-board memory slots 104-3 and 104-4. If the processor 102-1 needs extra memory space outside of the memory modules installed in the set of on-board memory module slots 104-1 and 104-2, the processor 102-1 must coordinate with the processor 102-2 for access to memory modules installed in the set of on-board memory module slots 104-3 and 104-4.

The processor 102-1 coordinating with the processor 102-2 for additional memory capacity is sometimes detrimental to performance. For example, the processor 102-2 can execute different commands from different applications in the ordinary course of operation. Any requests from the processor 102-1 to the processor 102-2 will be queued in a task list inbetween other commands. Accessing on-board memory is usually slower than accessing local cache memory. Having the processor 102-1 wait for the processor 102-2 to pick up the request will introduce additional read and write delays if the processor 102-1 is attempting use memory modules in the set of on-board memory module slots 104-3 and 104-4.

Increased read and write delays are not the only disadvantages of the two-processor configuration of FIG. 1. If a second processor does not add any beneficial performance to the applications that will run on the motherboard 100, then the cost of adding the second processor (e.g., the processor 102-2) just to be able to access the set of on-board memory module slots 104-3 and 104-4 is wasted. This is because memory-intensive applications that require access to additional memory provided in the set of on-board memory module slots 104-3 and 104-4 will take advantage of the additional memory but not the second processor. Adding an unnecessary processor unduly increases costs, and as such, embodiments of the present disclosure provide a memory interposer to alleviate underutilization of the motherboard 100 when a second processor (e.g., the processor 102-2) is not installed.

Figure 2:
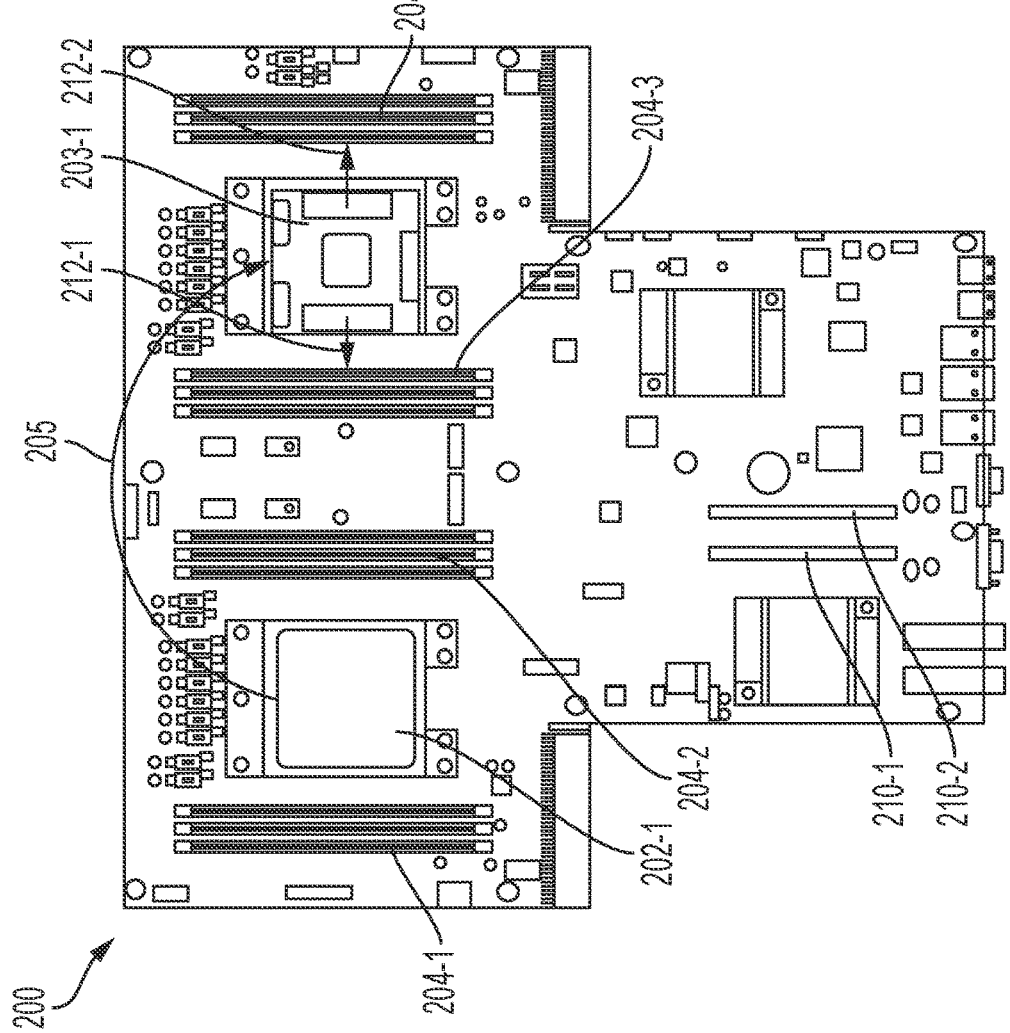
FIG. 2 illustrates a processor arrangement on an example motherboard, according to some implementations of the present disclosure.

FIG. 2 illustrates a processor arrangement on an example motherboard 200, according to some implementations of the present disclosure. The motherboard 200 includes a processor 202-1 with access to a set of on-board memory module slots 204-1 and 204-2. The motherboard 200 includes an interposer 203-1 with access to a set of on-board memory module slots 204-3 and 204-4. The processor 202-1 is matched to PCIe expansion slot 210-1, and PCIe expansion slot 210-2 is matched to the interposer 203-1. The interposer 203-1 provides the processor 202-1 with access to memory modules installed in the set of on-board memory module slots 204-3 and 204-4. The interposer 203-1 can communicate with the processor 202-1 using a first connection 205. The first connection 205 can be a high speed connection that supports PCIe or a compute express link (CXL) interface. The first connection 205 can be a routed cable. The interposer 203-1 can interface with memory modules in the set of on-board memory module slots 204-3 and 204-4 using second connections 212-1 and 212-2, respectively. The second connections 212-1 and 212-2 are high speed connections that support DDR standards (e.g., DDR3, DDR4, DDR5, etc.).

Figure 3:
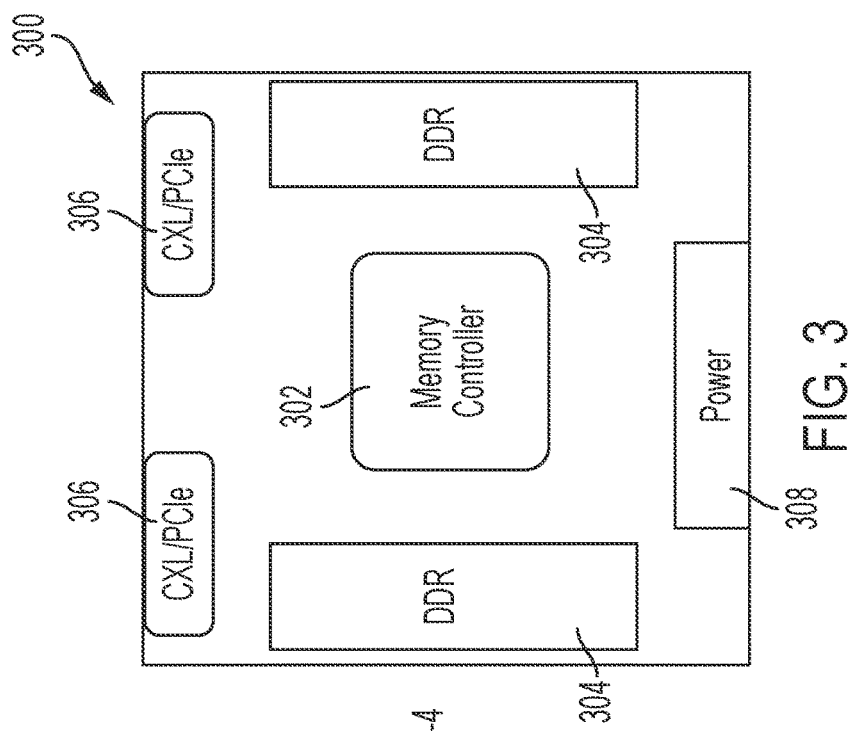
FIG. 3 is block diagram of an example memory interposer, according to some implementations of the present disclosure.

FIG. 3 is block diagram of a memory interposer 300, according to some implementations of the present disclosure. The memory interposer 300 includes DDR communication circuits 304, CXL or PCIe communication circuits 306, power circuitry 308, and a memory controller 302. The power circuitry 308 can include power regulators for the different circuits on the memory interposer 300. The DDR communication circuits 304 interface with DDR memory modules (e.g., memory modules installed in the set of on-board memory module slots 204-4 of FIG. 2). The DDR communication circuits 304 include DDR interface that follow JEDEC standards. The CXL or PCIe communication circuits 306 allow the memory controller 302 to communicate with a processor (e.g., the processor 202-1 of FIG. 2).

The memory controller 302 interprets signals from a processor such that the processor can access the DDR memory modules connected to the DDR communication circuits 304. In some implementations, the processor provides the memory controller 302 with information to be stored, and the memory controller 302 generates address locations in the DDR memory modules for storing the information. The memory controller 302 can include a look-up table for translating addresses provided by the processor to addresses in the DDR memory modules. The memory interposer 300 is distinguishable from a processor because the memory interposer 300 is unable to run general purpose programs and is specifically capable of providing memory access to inaccessible memory. As such, in FIG. 2, the processor 202-1 cannot be replaced with an interposer to have two interposers on the motherboard 200. Logically, the memory interposer 300 is analogous to an extended memory function for an accompanying processor (e.g., the processor 202-1 of FIG. 2). The memory interposer 300 having a simple structure can promote processing speed for memory access when compared to a more complicated general purpose processor.

Figure 4B:
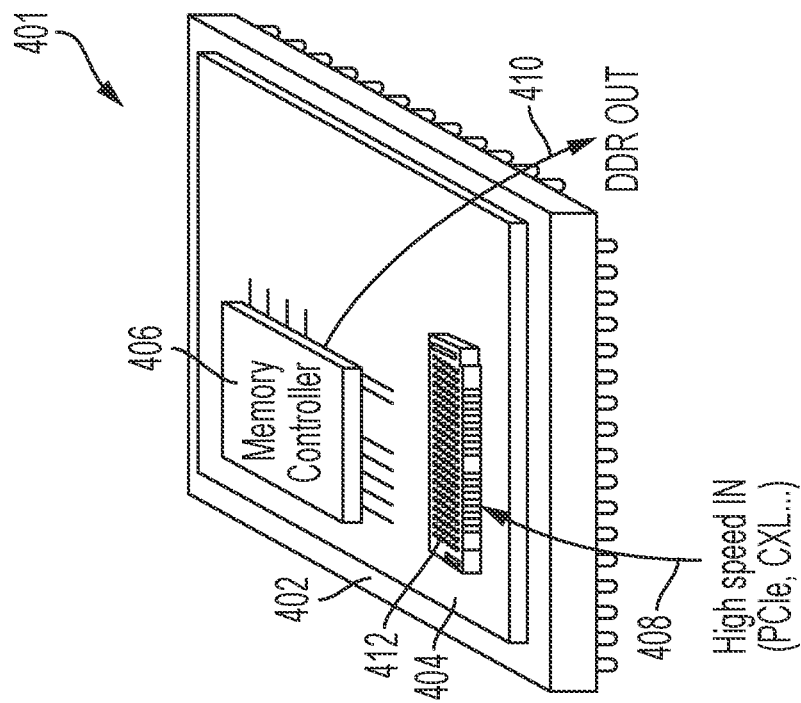
FIG. 4B illustrates a second interposer for accessing memory modules, according to some implementations of the present disclosure.
Figure 4A:
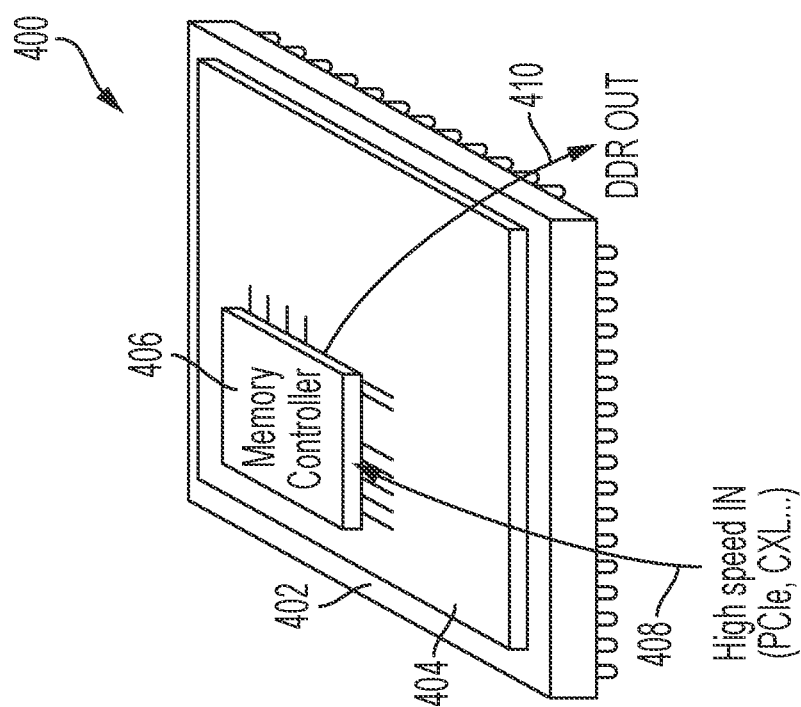
FIG. 4A illustrates a first interposer for accessing memory modules, according to some implementations of the present disclosure.

FIG. 4A illustrates an example interposer 400 for accessing memory modules, according to some implementations of the present disclosure. The interposer 400 is similar to or the same as the memory interposer 300. The interposer 400 includes pins that allow it to be installed in a processor socket. For example, the interposer 400 includes a memory controller chip 406 provided on a circuit board 404. The circuit board 404 can be bonded to a package 402 that includes pins for installing in the processor socket. The interposer 400 includes a high speed communication interface 408 (e.g., a PCIe or CXL interface). The interposer 400 includes a DDR communications interface 410. The interposer 400 is shown as receiving signals from a processor via the high speed communication interface 408 and providing signals to DDR memory modules via the DDR communications interface 410.

FIG. 4B illustrates an example interposer 401 for accessing memory modules, according to some implementations of the present disclosure. The interposer 401 is similar to or the same as the memory interposer 300 (in FIG. 3). The interposer 401 includes the memory controller 406, the circuit board 404, the package 402, the high speed communication interface 408, and the DDR communications interface 410. The interposer 401 can further include a connector 412. In some implementations, the connector 412 can be a copper-based high speed connector (e.g., a PCIe connector). The connector 412 can be an optional interconnect module provided on the interposer 401. The optional interconnect module can be advantageous. For example, instead of routing signals between the processor 202-1 and the memory interposer 203-1 through routed interconnects on the motherboard, a cable connection can be used with the connector 412. The cable connection can also be used to connect the memory interposer 203-1 to other motherboards, providing shorter paths between the interposer 203-1 and processors on the other motherboards. In some implementations, the routed interconnects on the motherboard and the cable connection are used to connect the interposer 203-1 to the processor 202-1 on the same board and a processor on another board, respectively.

Figure 5:
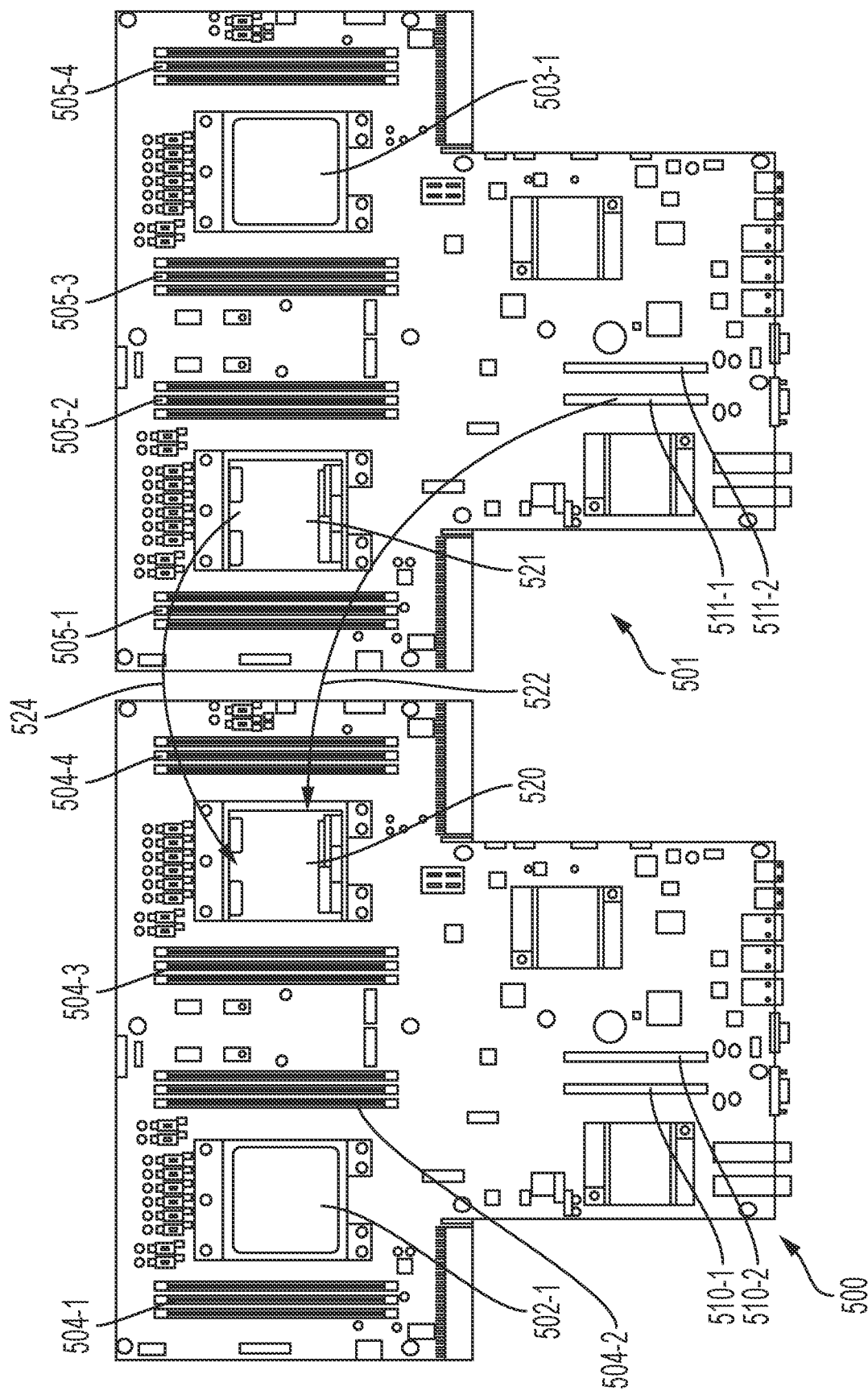
FIG. 5 illustrates a quad processor system with a memory interposer, according to some implementations of the present disclosure.

FIG. 5 illustrates a quad processor system with two motherboards 500, 501 using a memory interposer 520, according to some implementations of the present disclosure. The two motherboards 500, 501 can be connected to each other using PCIe busx8 cable 524 or PCIe busx8 cable 522. The motherboard 500 includes a set of on-board memory module slots 504-1, 504-2, 504-3, and 504-4. The motherboard 500 includes PCIe expansion slots 510-1 and 510-2. The motherboard 500 includes a processor 502-1 and a memory interposer 520. Similarly, the motherboard 501 includes a set of on-board memory module slots 505-1, 505-2, 505-3, and 505-4. The motherboard 501 includes PCIe expansion slots 511-1 and 511-2. The motherboard 501 includes a processor 503-1 and a second processor 521. Memory access to the set of on-board memory modules in the slots 504-3 and 504-4 is made possible by the memory interposer 520. Any one of the processors 521, 503-1, or 502-1 can access the set of on-board memory module slots 504-3 and 504-4 via the memory interposer 520, thereby allowing additional memory to be available to the processors. The memory interposer 520 enables the efficient use of all sets of on-board memory modules in the slots 505-1, 505-2, 505-3, and 505-4 without having to have four processors in the motherboards 500, 501.

FIG. 5 is provided as an example, but more than two motherboards can be connected together using PCIe cables. For example, three, four, or five motherboards can be connected together. These motherboards can include one or more processors (e.g., the processor 502-1) and/or one or more interposers (e.g., the memory interposer 520). The one or more interposers can provide access to memory modules that would otherwise be inaccessible if all processor sockets did not contain a processor.

Figure 6:
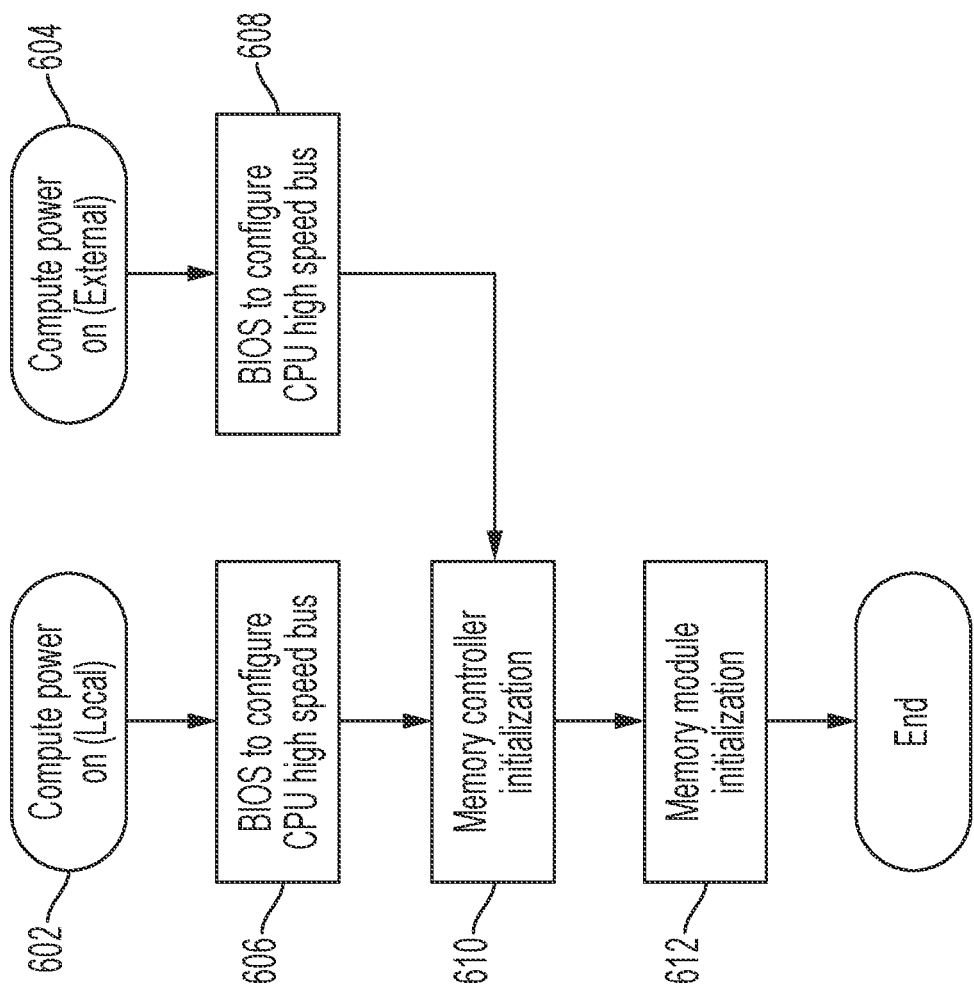
FIG. 6 is a flow diagram for initializing a memory interposer, according to some implementations of the present disclosure.

FIG. 6 is a flow diagram for initializing a memory interposer in a system, according to some implementations of the present disclosure. The system can include a server, a desktop computer, etc. At steps 602 and 604, system power is turned on. At step 602, local power (e.g., the power circuitry 308 of FIG. 3) of the memory interposer is turned on. At step 604, external power (e.g., power for the processor 202-1 of FIG. 2) is turned on. Steps 602 and 604 can be performed simultaneously or step 602 can be performed after step 604.

At steps 606 and 608, high speed buses for processor communications are configured. The system includes a non-volatile memory that stores Basic Input/Output System (BIOS) program that initializes hardware for the system. The BIOS configures a high speed bus for a processor (e.g., the processor 202-1) to communicate with other hardware components installed in the system. Since the system includes two processor sockets, step 606 involves configuring a high speed bus for communicating with the memory interposer installed in one of the processor sockets, and step 608 involves configuring high speed bus for communicating with the processor installed in the other processor socket.

At step 610, a memory controller of the memory interposer (e.g., the memory controller 302 of FIG. 3) is initialized. The BIOS initializes the memory controller. In some implementations, memory controller initialization includes determining a clock speed for operating read and write actions, determining whether a detected memory supports simultaneous read/write, determining size of buffer on the memory controller, etc.

At step 612, one or more memory modules connected to the memory controller are initialized. After the BIOS initializes the memory controller, then the memory controller initializes the one or more memory modules. In some implementations, voltage levels for operating the memory modules in a low-power mode and in a performance mode are set. Internal clocks for the memory modules can be set.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system, comprising:
a processor coupled to a first connection;
a memory module coupled to a second connection; and
an interposer coupled to the first connection and the second connection, the interposer including an optional interconnect module, socket pins, and a memory controller circuit, wherein the memory controller circuit receives signals from the processor, using the first connection, and transmits the received signals to the memory module, using the second connection, wherein the optional interconnect module protrudes from a top surface of the interposer and provides a copper-based high speed pluggable interface on the top surface of the interposer for plugging in a routing cable, and wherein the socket pins are located on a bottom surface of the interposer; and
a first motherboard including two processor sockets, wherein the processor is connected to a first one of the two processor sockets, and the interposer is connected to a second one of the two processor sockets; and
a second motherboard including another two processor sockets, wherein the interposer is connected to a second interposer using the cable, the second interposer installed on one of the another two processor sockets on the second motherboard using the cable.

2. The system of claim 1, wherein the first connection is a high speed connection that supports a compute express link (CXL) interface or a Peripheral Component Interconnect Express (PCIe) interface.

3. The system of claim 1, wherein the second connection supports a double data rate (DDR) standard including DDR3, DDR4, or DDR5.

4. The system of claim 1, wherein the memory controller circuit interprets signals between the memory module, and the processor to allow the processor access to the memory module.

5. The system of claim 1, wherein the optional interconnect module is for the first connection.

6. The system of claim 1,
wherein the interposer is electrically connected to an installed processor on the second motherboard.

7. The system of claim 6, wherein the installed processor on the second motherboard has access to memory modules on the first motherboard via the interposer on the first motherboard and the second interposer on the second motherboard.

8. The system of claim 1, wherein the processor is one of a central processing unit (CPU) or a graphics processing unit (GPU).

9. An interposer for expanding accessible memory available to a processor, the interposer comprising:
a circuit board;
a package with socket pins insertable in a processor socket in a motherboard wherein the circuit board is bonded to the package and the socket pins are located on a bottom surface of the interposer;
a high speed communication interface on the circuit board, the high speed communication interface including an optional interconnect module for cable routing, the optional interconnect module protruding from a top surface of the interposer and providing a copper-based high speed pluggable interface on the top surface of the interposer for plugging in a cable connector;
a double data rate (DDR) communication interface on the circuit board; and
a memory controller circuit that transmits signals received from the processor via the high speed communication interface to a memory module using the DDR communication interface; and
wherein a cable connected to the optional interconnect module connects to a second interposer installed on one of the another two processor sockets on a second motherboard.

10. The interposer of claim 9, wherein the high speed communication interface is one of a compute express link (CXL) interface or a PCI Express (PCIe) interface.

11. The interposer of claim 9, wherein the processor is one of a central processing unit (CPU) or a graphics processing unit (GPU).

* * * * *